(12) United States Patent
Fox et al.

(10) Patent No.: US 12,535,796 B2
(45) Date of Patent: Jan. 27, 2026

(54) EMBEDDED SENSOR CHIPS IN 3D AND 4D PRINTED STRUCTURES THROUGH SELECTIVE FILAMENT INFUSION

(71) Applicant: INTERNATIONAL BUSINESS MACHINES CORPORATION, Armonk, NY (US)

(72) Inventors: Jeremy R. Fox, Georgetown, TX (US); Martin G. Keen, Cary, NC (US); Alexander Reznicek, Troy, NY (US); Bahman Hekmatshoartabari, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 18/066,439

(22) Filed: Dec. 15, 2022

(65) Prior Publication Data

US 2024/0201654 A1     Jun. 20, 2024

(51) Int. Cl.
*G05B 19/4099* (2006.01)

(52) U.S. Cl.
CPC ............ *G05B 19/4099* (2013.01); *G05B 2219/49023* (2013.01)

(58) Field of Classification Search
CPC ......... B33Y 80/00; B33Y 10/00; B33Y 50/02; B22F 10/39; B29C 64/393; B29C 64/386; G05B 19/4099; G05B 2219/49023
See application file for complete search history.

(56) References Cited

U.S. PATENT DOCUMENTS

| 4,510,305 | A | 4/1985 | Korsgen et al. | |
|---|---|---|---|---|
| 8,858,856 | B2 * | 10/2014 | Kozlak | B29C 64/188 |
| | | | | 264/308 |
| 8,936,961 | B2 | 1/2015 | Bedell et al. | |
| 9,656,428 | B2 * | 5/2017 | Voris | B33Y 50/02 |
| 9,706,076 | B2 * | 7/2017 | Nuuja | G06F 21/73 |
| 10,136,954 | B2 | 11/2018 | Johnson | |
| 10,186,546 | B2 | 1/2019 | De Graff | |
| 10,569,466 | B2 * | 2/2020 | Douglas | B29C 64/40 |

(Continued)

FOREIGN PATENT DOCUMENTS

| CN | 106313573 A | * | 1/2017 | ............. B22F 3/115 |
|---|---|---|---|---|
| KR | 20200142481 A | * | 12/2020 | ............. B33Y 50/02 |

(Continued)

OTHER PUBLICATIONS

Black, "ARTBA 2022 Bridge Report," American Road & Transportation Builders Association, 2022, [accessed Aug. 22, 2022], 10 pgs., Retrieved from the Internet: <https://artbabridgereport.org/>.

(Continued)

*Primary Examiner* — Yongjia Pan
(74) *Attorney, Agent, or Firm* — Michael A. Petrocelli

(57) ABSTRACT

A method, computer program, and computer system are provided for enabling chip-infused filament for 3D printing. A structure to be formed through 3D printing is identified. A type associated with one or more sensors embedded in a polymer filament and a location are determined for the one or more sensors within the structure. The structure may then be 3D printed with the one or more sensors at the location based on using the polymer filament at the location within the structure.

20 Claims, 8 Drawing Sheets

(56) References Cited

U.S. PATENT DOCUMENTS

| | | | |
|---|---|---|---|
| 10,753,902 | B2 | 8/2020 | Hekmatshoartabari |
| 11,101,255 | B2 | 8/2021 | Murialdo et al. |
| 11,192,309 | B2 | 12/2021 | MacNeish et al. |
| 11,236,957 | B2 | 2/2022 | Rhoden et al. |
| 11,256,883 | B2 | 2/2022 | Afzali-Ardakani et al. |
| 2005/0212675 | A1* | 9/2005 | Green ............ F16J 15/064 340/572.8 |
| 2012/0112886 | A1* | 5/2012 | Yang ............ B29B 9/12 340/10.1 |
| 2016/0016360 | A1* | 1/2016 | Voris ............ B33Y 70/00 252/582 |
| 2017/0120528 | A1* | 5/2017 | Tejada Palacios .... B29C 64/118 |
| 2017/0225395 | A1 | 8/2017 | Boydston et al. |
| 2017/0259509 | A1* | 9/2017 | Chang ............ B29C 64/393 |
| 2017/0348899 | A1* | 12/2017 | O'Neill ............ B29C 64/124 |
| 2018/0050501 | A1* | 2/2018 | Talyansky ............ B29C 64/118 |
| 2018/0318932 | A1* | 11/2018 | Myerberg ............ B22F 3/115 |
| 2019/0047210 | A1 | 2/2019 | Hussain et al. |
| 2019/0344506 | A1* | 11/2019 | Franken ............ G07D 7/20 |
| 2020/0061929 | A1* | 2/2020 | Veshchikov ............ B29C 64/118 |
| 2020/0194410 | A1* | 6/2020 | Murialdo ............ H01L 25/16 |
| 2020/0361138 | A1* | 11/2020 | De Jong ............ H05K 1/165 |
| 2020/0391440 | A1* | 12/2020 | Lienhart ............ B29C 64/118 |
| 2022/0196491 | A1 | 6/2022 | Dubov |
| 2023/0173749 | A1* | 6/2023 | Houwing ............ B33Y 10/00 264/308 |
| 2024/0202386 | A1 | 6/2024 | Fox et al. |

FOREIGN PATENT DOCUMENTS

| | | | | |
|---|---|---|---|---|
| WO | WO-2017207514 | A1 * | 12/2017 | ............ B29C 70/88 |
| WO | 2018085936 | A1 | 5/2018 | |
| WO | 2021114603 | A1 | 6/2021 | |

OTHER PUBLICATIONS

Chang, et al., "Integration of High-Resolution Laser Displacement Sensors and 3D Printing for Structural Health Monitoring," Sensors, MDPI, Jan. 2018, vol. 18, No. 1, Published online Dec. 22, 2017, [accessed Aug. 22, 2022], doi: 10.3390/s18010019, 19 pgs., Retrieved from the Internet: <https://www.ncbi.nlm.nih.gov/pmc/articles/PMC5795710/>.

Diallo, B., "3D Printer Filament Types and Uses | Leapfrog 3D Printers," LeapFrog, [accessed Aug. 2, 2022], 20 pgs., Retrieved from the Internet: <https://www.lpfrg.com/guides/3d-printer-filament-types/>.

Disclosed Anonymously, "Method and System for Personalized Health Monitoring Enabling Group-Owned Everyday Gadget With Smart Sensors," IP.com Prior Art Database Technical Disclosure, IP.com No. IPCOM000256354D, Nov. 21, 2018, 2 pgs.

Disclosed Anonymously, "System and Method for Offline Asset Monitoring Using 3D-Printed Sensors," IP.com Prior Art Database Technical Disclosure, IP.com No. IPCOM000261982D, Apr. 22, 2020, 6 pgs.

Hinderdael, M. et al. "Effective Structural Health Monitoring System for 3D Printed Components," ResearchGate, Conference Paper, Jun. 2015, [accessed Sep. 8, 2022], 2 pgs.

Hitachi, "Hitachi Global: News Release: Hitachi Develops a New RFID with Embedded Antenna μChip," Hitachi, Ltd., Tokyo, Sep. 2, 2003, [accessed Aug. 8, 2022], 2 pgs., Retrieved from the Internet: <https://www.hitachi.com/New/cnews/030902_030902.html>.

Huang, et al., "Rheological characterization of polymer/ceramic blends for 3D printing of bone scaffolds" published in Polymer Testing, ScienceDirect, vol. 68, Jul. 2018, pp. 365-378, downloaded on Oct. 6, 2022 from https://www.research.manchester.ac.uk/portal/files/69592814/POTE_2018_216_Revision_1_V0.pdf, 45 pgs.

Loewke, et al., "Structural Health Monitoring of Composite Materials Using the Two-Dimensional Fast Fourier Transform," Smart Materials and Structures, 2004, [accessed Sep. 8, 2022], 17 pgs., Retrieved from the Internet: <http://www-ceam.ucsd.edu/documents/papers/kevin.pdf>.

Munasinghe, et al., "3-D Printed Strain Sensor for Structural Health Monitoring," IEEE, 2019 IEEE International Conference on Cybernetics and Intelligent Systems (CIS) and IEEE Conference on Robotics, Automation and Mechatronics (RAM), Nov. 2019, Bangkok, Thailand, pp. 275-280, DOI: 10.1109/CIS-RAM47153.2019.9095826.

Olivas, et al., "Structural Electronics through Additive Manufacturing and Micro-Dispensing," IMPAS 2010—43rd International Symposium on Microelectronics, Jan. 1, 2010, pp. 000940-000946, accessed Oct. 6, 2022 from MAPSource Microelectronics Research Portal: <https://meridian.allenpress.com/ism/article/2010/1/000940/35239/Structural-Electronics-through-Additive>.

Raghavan, et al., "Finite-Dimensional Piezoelectric Transducer Modeling for Guided Wave Based Structural Health Monitoring," Institute of Physics Publishing Ltd, Smart Materials and Structures (2005), Published Nov. 9, 2005, pp. 1448-1461.

Rastogi, "Design of PZT Sensor Strip for Structural Health Monitoring, With Added Structural Strength Benefit for Composite Laminates," IP.com Prior Art Technical Disclosure, IP.com No. IPCOM000237704D, Jul. 4, 2014, 7 pgs.

Rastogi, et al., "Integrated PZT Sensors for Structural Health Monitoring of Metals and Composite Structures," IP.com Prior Art Database Technical Disclosure, IP.com No. IPCOM000237672D, Jul. 2, 2014, 8 pgs.

Smith, et al., "Structural Health Monitoring of 3D Printed Structures," Solid Freeform Fabrication Symposium, Austin, Texas, U.S.A., Aug. 13, 2018-Aug. 15, 2018, Published Dec. 1, 2018, [accessed Sep. 8, 2022], U.S. Department of Energy, pp. 2211-2218, Retrieved from the Internet: <https://www.osti.gov/servlets/purl/1493145>.

Sparkes, "World's First 3D-printed Steel Bridge Opens in Amsterdam," New Scientist, Technology, Jul. 15, 2021, [accessed Dec. 13, 2022], 4 pgs., Retrieved from the Internet: <https://www.newscientist.com/article/2283934-worlds-first-3d-printed-steel-bridge-opens-in-amsterdam/>.

Spinelli et al., "Morphological, Rheological and Electromagnetic Properties of Nanocarbon/Poly(lactic) Acid for 3D Printing: Solution Blending vs. Melt Mixing", Open Access, published Nov. 13, 2018 in Materials 2018, 11(11), 2256, MDPI, 18 pgs., Downloaded on Oct. 6, 2022 from <https://www.mdpi.com/1996-1944/11/11/2256>.

Wan, et al., "Structural Health Monitoring (SHM) of Three-Dimensional Braided Composite Material Using Carbon Nanotube Thread Sensors," Journal of Mechanics, vol. 29, No. 4, Dec. 2013, the Society of Theoretical and Applied Mechanics, R.O.C., Downloaded from https://academic.oup.com/jom/article/29/4/617/5948280 on Jul. 21, 2022, pp. 617-621.

Wang, "Thesis—Doctor of Philosophy, 3D printing self-sensing cementitious composites for structural health monitoring," The University of Western Australia, School of Engineering, Abstract Only, Unpublished—2021, [accessed Sep. 6, 2022], 3 pgs., Retrieved from the Internet: <https://research-repository.uwa.edu.au/en/publications/3d-printing-self-sensing-cementitious-composites-for-structural-h>.

Wikipedia, "List of Bridge Failures," Wikipedia.com, [accessed on Aug. 22, 2022], 31 pgs., Retrieved from the Internet: <https://en.wikipedia.org/wiki/List_of_bridge_failures#2000%E2%80%>.

Wikipedia, "List of Structural Failures and Collapses," Wikipedia.com, [accessed Aug. 22, 2022], 46 pgs., Retrieved from the Internet: <https://en.wikipedia.org/wiki/List_of_structural_failures_and_collapses>.

* cited by examiner

EMBEDDED SENSOR CHIPS IN 3D AND 4D PRINTED STRUCTURES THROUGH SELECTIVE FILAMENT INFUSION

FIELD

This disclosure relates generally to field of integrated circuit fabrication and, more particularly, to integrated circuits embedded in structures through additive manufacturing.

BACKGROUND 3D printing, or additive manufacturing, is the construction of a three-dimensional object from a CAD model or a digital 3D model. It can be done in a variety of processes in which material is deposited, joined or solidified under computer control, with material being added together (such as plastics, liquids or powder grains being fused), typically layer by layer.

SUMMARY

Embodiments relate to a method, system, and computer readable medium for enabling chip-infused filament for 3D printing. According to one aspect, a method for enabling chip-infused filament for 3D printing is provided. The method may include identifying a structure to be formed through 3D printing. A type associated with one or more sensors embedded in a polymer filament and a location are determined for the one or more sensors within the structure. The structure may then be 3D printed with the one or more sensors at the location based on using the polymer filament at the location within the structure.

According to another aspect, a computer system for enabling chip-infused filament for 3D printing is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a structure to be formed through 3D printing. A type associated with one or more sensors embedded in a polymer filament and a location are determined for the one or more sensors within the structure. The structure may then be 3D printed with the one or more sensors at the location based on using the polymer filament at the location within the structure.

According to yet another aspect, a computer readable medium for enabling chip-infused filament for 3D printing is provided. The computer readable medium may include one or more computer-readable storage devices and program instructions stored on at least one of the one or more tangible storage devices, the program instructions executable by a processor. The program instructions are executable by a processor for performing a method that may accordingly include identifying a structure to be formed through 3D printing. A type associated with one or more sensors embedded in a polymer filament and a location are determined for the one or more sensors within the structure. The structure may then be 3D printed with the one or more sensors at the location based on using the polymer filament at the location within the structure.

According to one or more aspects, the method may further include registering the one or more sensors and the location within the structure.

According to one or more aspects, the structure is caused to be 3D printed based on determining a filament feed associated with the location within the structure, wherein embedding of the polymer within the structure occurs based on requirements associated with the 3D-printable polymer filament.

According to one or more aspects, one or more types of 3D-printable polymer filament are used based on the requirements of the structure.

According to one or more aspects, the method may further include adjusting a filament quality based on capabilities associated with a printer associated with the structure.

According to one or more aspects, the 3D-printable polymer filament is embedded with the one or more sensors based on dispersing the one or more sensors within a solvent or an aqueous solution, forming 3D-printable polymer powder or pellets embedded with the one or more sensors from the solvent or aqueous solution, and forming the 3D-printable polymer filament embedded with the one or more sensors from the polymer powder or pellets.

According to one or more aspects, the 3D-printable polymer filament comprises one or more from among polylactic acid, acrylonitrile butadiene, polyethylene terephthalate glycol, polypropylene, carbon fiber, nylon, high-impact polystyrene, and thermoplastic elastomers.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 3A depicts a cross-sectional view of a process of formation of a silicon-on-oxide (SOI) substrate, according to at least one embodiment;

FIG. 3B depicts a cross-sectional view of a process of semiconductor devices on the SOI substrate, according to at least one embodiment;

FIG. 3C depicts a cross-sectional view of a process of deposition of an oxide layer, according to at least one embodiment;

FIG. 3D depicts a cross-sectional view of a process of etching an isolation trench between the semiconductor devices, according to at least one embodiment;

FIG. 3E depicts a cross-sectional view of a process of formation of a handle layer, according to at least one embodiment;

FIG. 3F depicts a cross-sectional view of a process of removal of a bulk silicon substrate layer, according to at least one embodiment;

FIG. 3G depicts a cross-sectional view of a process of removal of the handle layer and initialization of the semiconductor devices, according to at least one embodiment;

DETAILED DESCRIPTION

Figure 1:
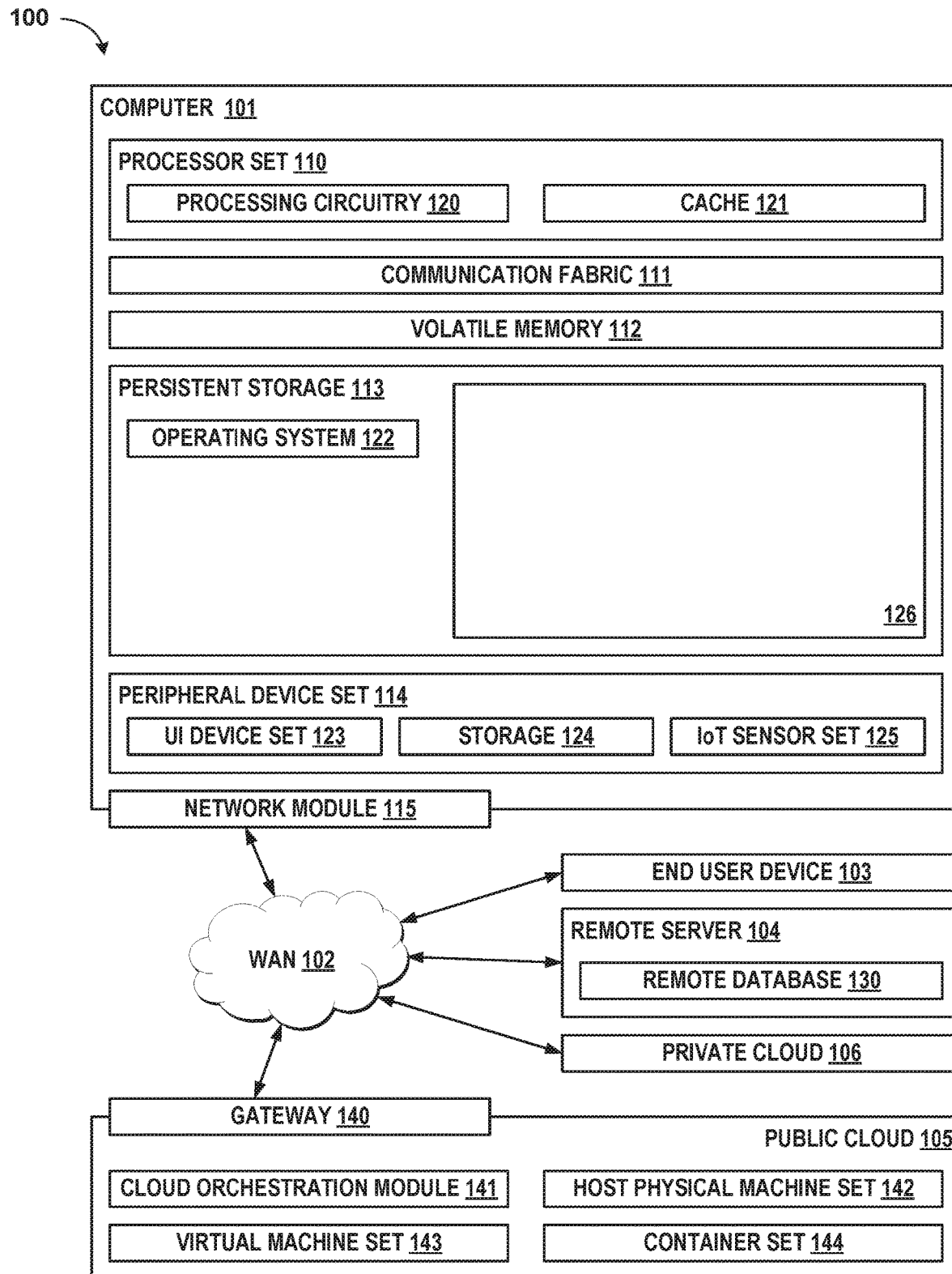
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of integrated circuit fabrication and, more particularly, to integrated circuits embedded in structures through additive manufacturing. The following described exemplary embodiments provide a system, method, and computer program to, among other things, enable chip-infused filament for 3D printing. Therefore, some embodiments have the capacity to improve the field of computing by allowing for control of infusion of sensors within a 3D-printed structure based on selecting a filament having embedded sensors during formation of the 3D-printed structure.

As previously described, 3D printing, or additive manufacturing, is the construction of a three-dimensional object from a CAD model or a digital 3D model. It can be done in a variety of processes in which material is deposited, joined or solidified under computer control, with material being added together (such as plastics, liquids or powder grains being fused), typically layer by layer.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program that enables chip-infused filament for 3D printing. Referring now to FIG. 1. Computing environment 100 contains an example of an environment for the execution of at least some of the computer code involved in performing the inventive methods, such as Filament Infusion and Printing 126. In addition to Filament Infusion and Printing 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Filament Infusion and Printing 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Filament Infusion and Printing 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Filament Infusion and Printing 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
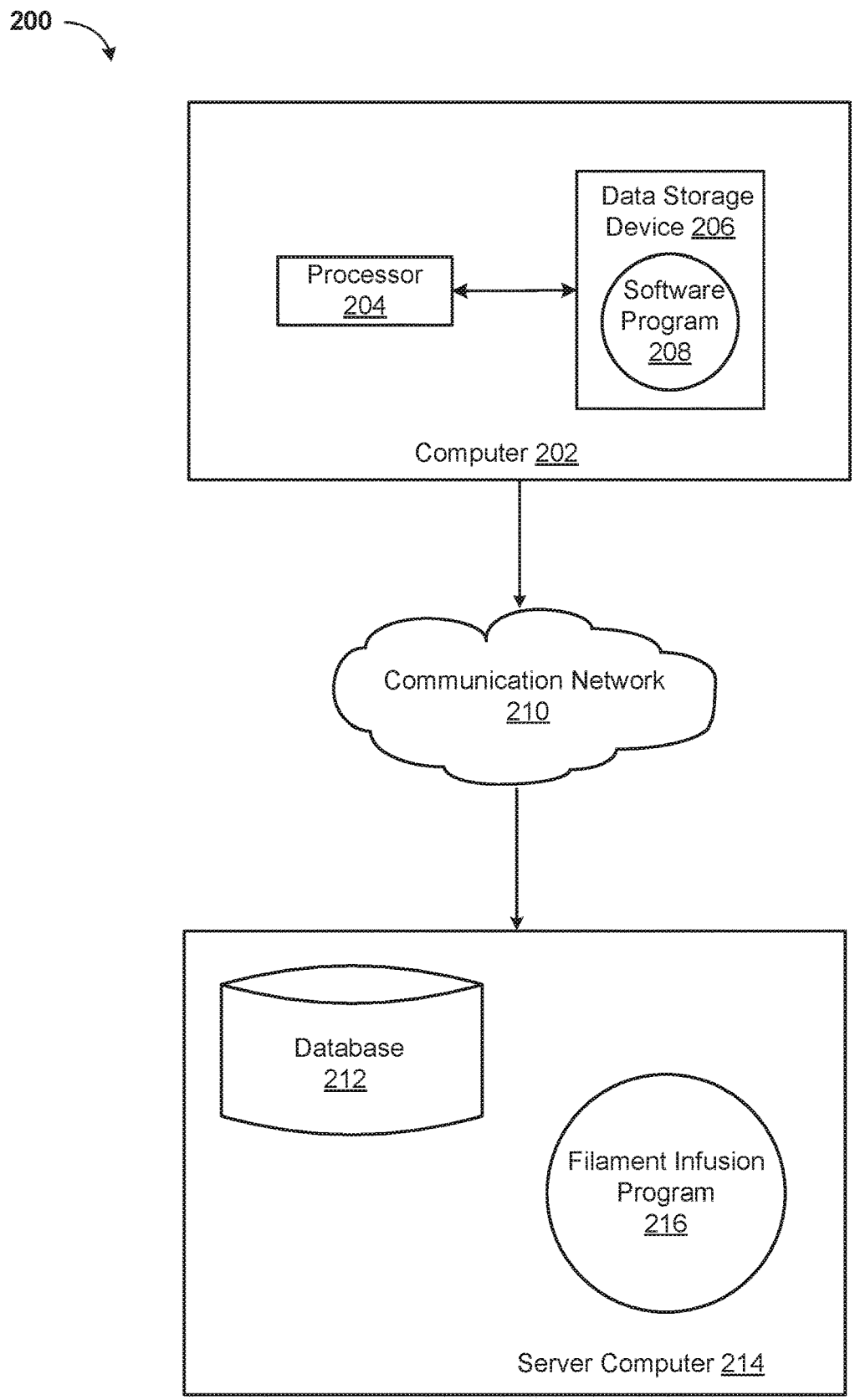
FIG. 2 illustrates a networked computer environment according to at least one embodiment.

Referring now to FIG. 2, a functional block diagram of a networked computer environment illustrating a 3D printing system 200 (hereinafter "system") for enabling chip-infused filament for 3D printing. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. As will be discussed below with reference to FIG. 6, the computer 202 may include internal components 800A and external components 900A, respectively, and the server computer 214 may include internal components 800B and external components 900B, respectively. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for enabling chip-infused filament for 3D printing is enabled to run a Filament Infusion Program 216 (hereinafter "program") that may interact with a database 212. The Filament Infusion Program is explained in more detail below with respect to FIG. 5. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger filament infusion program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

FIGS. 3A-3G depict fabrication steps for semiconductor devices (e.g., sensors) to be embedded within polymer filament for 3D and 4D printed structures.

Figure 3A:
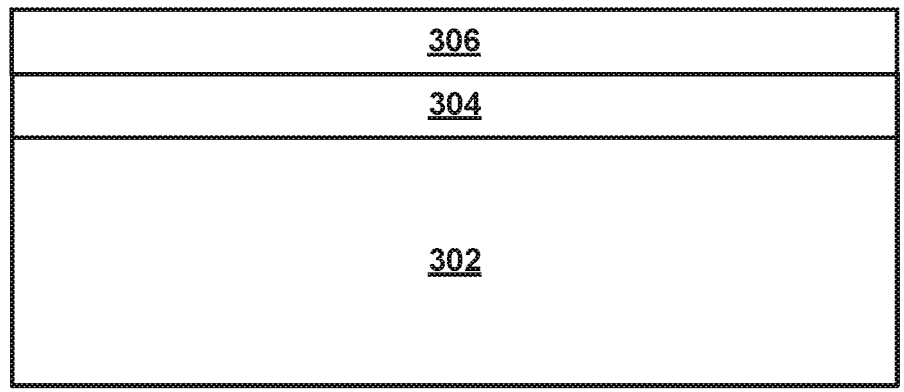
FIGS. 3A-3G illustrate the steps of a method of forming an interconnect structure, according to at least one embodiment.

Referring now to FIG. 3A, formation of a silicon-on-insulator (SOI) substrate of an integrated circuit 300 is depicted according to one or more embodiments. The silicon-on-insulator substrate may include a substrate 302, a buried oxide (BOX) layer 304, and a silicon-on-insulator (SOI) layer 306. The substrate 302 may include a silicon-based material. Illustrative examples of silicon-based materials suitable for the substrate 302 may include, but are not limited to, silicon, silicon, silicon-germanium, silicon-germanium-carbon, silicon-carbon, and multi-layers thereof. The buried oxide layer 304 may be formed by ion implantation or wafer bonding. The silicon-on-insulator layer 306 may undergo chemical-mechanical planarization or other suitable preparation steps to allow for the formation of semiconductor devices on the SOI substrate.

Figure 3B:
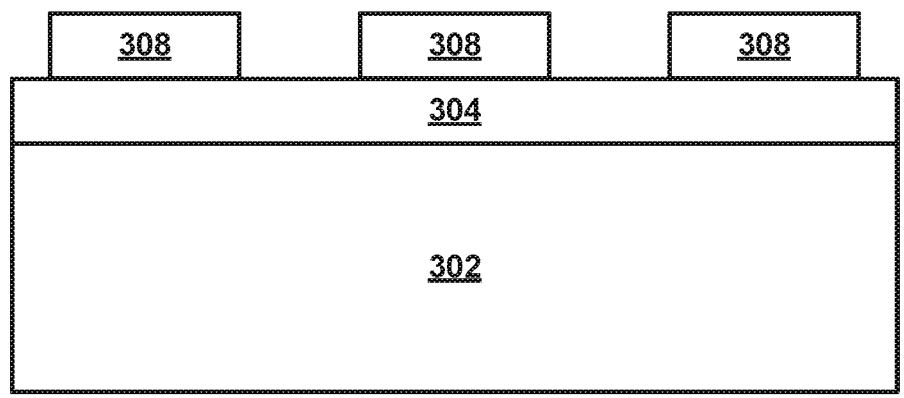

Referring now to FIG. 3B, formation of semiconductor devices 308 on buried oxide layer 304 of the SOI substrate of the integrated circuit 300 is depicted according to one or more embodiments. The semiconductor devices 308 are fabricated using conventional semiconductor fabrication technologies. The semiconductor devices 308 may include, for example, active RFID chips and sensors such as stress/strain gauges and accelerometers. The semiconductor devices 308 may include one or more of the following, energy harvesting devices such as solar cells or RF coils, batteries, wireless transmission devices such as antennas or passive/chipless RFID, memory, sensors including photodetectors, resonators and chemical/health monitoring devices, active or passive semiconductor devices such as transistors and capacitors.

Figure 3C:
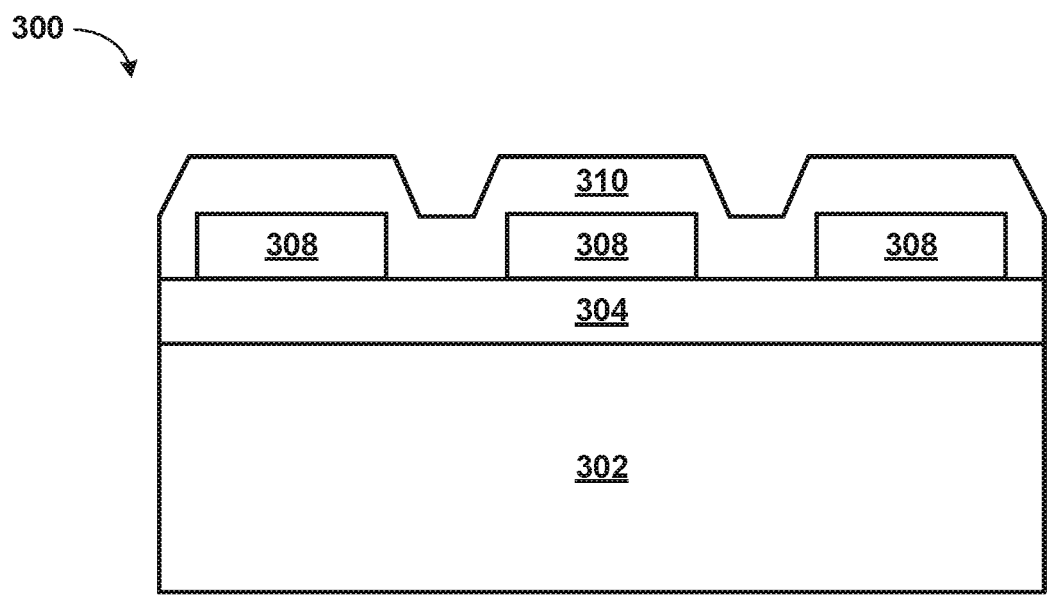

Referring now to FIG. 3C, deposition of an oxide layer 310 on the integrated circuit 300 is depicted according to one or more embodiments. The oxide layer 310 may be a non-crystalline solid material such as silicon dioxide, undoped silicate glass, fluorosilicate glass, borophosphosilicate glass, a spin-on low-k dielectric layer, a chemical vapor deposition low-k dielectric layer or any combination thereof. The term "low-k" as used throughout the present disclosure denotes a dielectric material that has a dielectric constant of less than silicon dioxide. In another embodiment, a self-planarizing material such as a spin-on glass (SoG) or a spin-on low-k dielectric material can be used as the oxide layer 310. The use of a self-planarizing dielectric material as the oxide layer 310 may avoid the need to perform a subsequent planarizing step.

In some embodiments, the oxide layer 310 can be formed on exposed surfaces of the buried oxide layer 304 and the tops of semiconductor devices 308 utilizing a deposition process including, for example, chemical vapor deposition, plasma enhanced chemical vapor deposition, evaporation, or spin-on coating. In some embodiments, particularly when non-self-planarizing dielectric materials are used as the oxide layer 310, a planarization process or an etch back process follows the deposition of the material that provides the oxide layer 310. Thus, the semiconductor devices 308 may be capped with the oxide layer 310. Pre-programming of certain semiconductor devices 308, such as memory devices, may be performed before the capping if required. Metal wiring passing between the units that may be used for device programming or testing may be etched away by conventional lithography prior to capping.

Figure 3D:
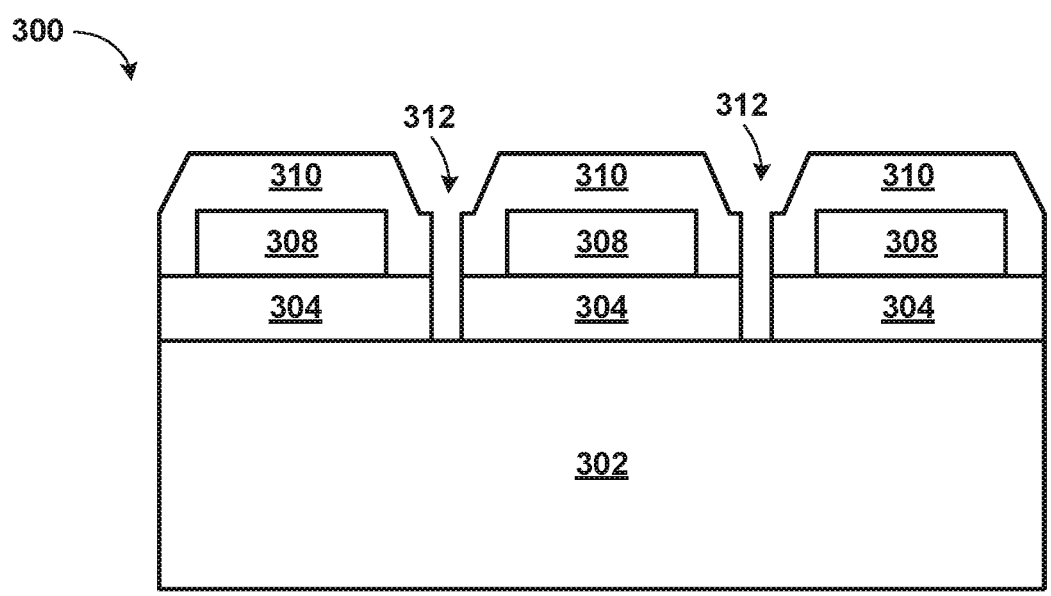

Referring now to FIG. 3D, formation of one or more trenches 312 in the oxide layer 310 of the integrated 300 is depicted according to one or more embodiments. The etch process may include reactive ion etching, laser ablation, or any etch process which can be used to selectively remove a portion of material. An isolation via etch is performed through the oxide layer 310, and the buried oxide layer 304 down to the substrate 302.

Figure 3E:
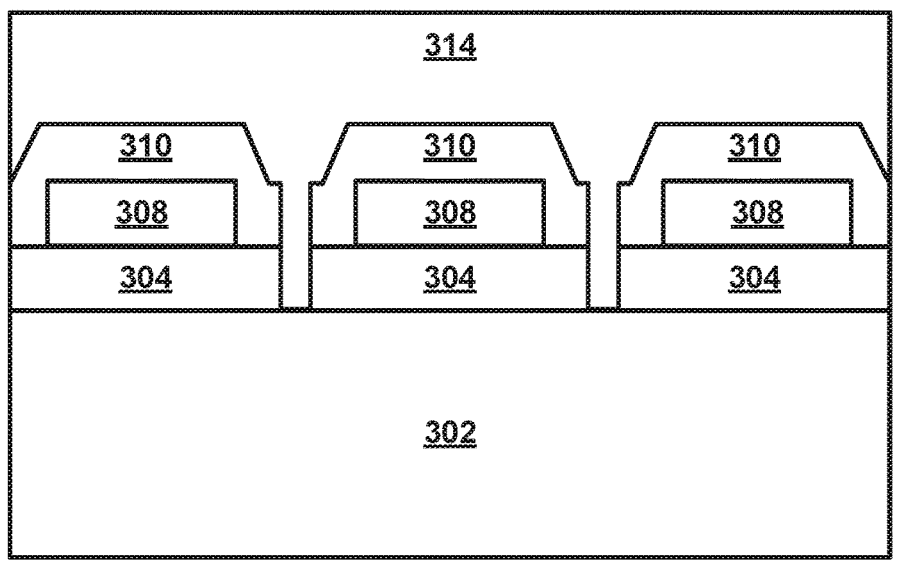

Referring now to FIG. 3E, formation of a handle layer 314 on the integrated circuit 300 is depicted according to one or more embodiments. The handle layer 314 is deposited on top of the oxide layer 310. In one example, the handle layer 314 is composed of, or includes, a spin-on water-soluble material such as polyvinyl alcohol. In another example, the handle layer 314 includes a spin-on resist which is soluble in organic solvents. In yet another example, the handle layer 314 includes a cleave layer (e.g., sputtered amorphous zinc-oxide), a stressor layer (e.g., sputtered nickel), and a flexible support substrate attached thereon using an adhesive, which is subsequently used to remove the flexible support substrate by cleaving through the cleave layer. The handle layer 314 may be deposited utilizing deposition techniques including, for example, dip coating, spin-coating, brush coating, sputtering, chemical vapor deposition, plasma enhanced chemical vapor deposition, chemical solution deposition, physical vapor deposition, and plating. In some embodiments, the handle layer 314 may be applied atop the oxide layer 310 by hand or by mechanical means.

Figure 3F:
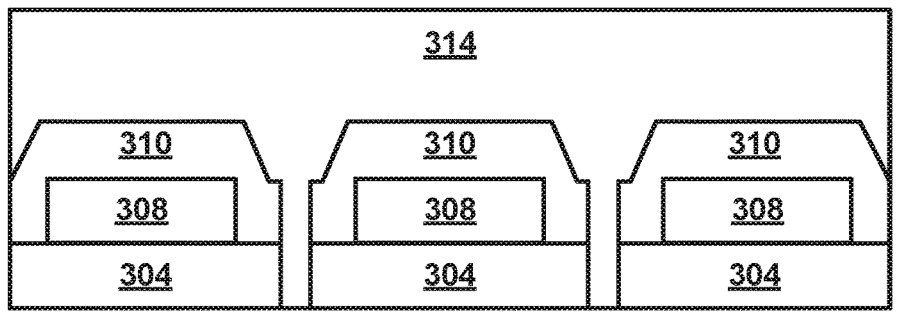

Referring now to FIG. 3F, removal of the substrate 302 of the integrated circuit 300 is depicted according to one or more embodiments. The substrate 302 may be removed by mechanical grinding, chemical wet and/or dry etching, or any combination thereof. The substrate 302 may also be removed by controlled spalling through the substrate 302 close to the buried oxide layer 304, followed by chemical etching.

Figure 3G:
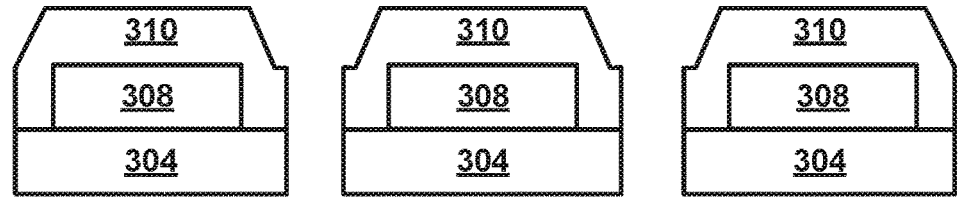

Referring now to FIG. 3G, removal of the handle layer 314 and initialization of the semiconductor devices 308 of the integrated circuit 300 is depicted according to one or more embodiments. The handle layer 314 may be dissolved or detached in a wet solution. The integrated circuits 300 may be released into the solution and may then be functionalized. The integrated circuits 300 (e.g., sensor chips) can be dispersed in a polymer carrier in an either aqueous solution or organic solvent.

For organic solvent dispersion, the integrated circuits 300 can be first coated with monolayers of alkylsilanes by immersing the integrated circuits 300 in a dilute (e.g. 0.1-1%) solution of alkyl trimethoxysilane and then rinsing with the solvent (e.g. ethanol, or water or the mixture of). In this process, the surface of the integrated circuits 300 can be coated with monolayers of long chain (2-16 carbon atoms) alkyl group which may allow for dispersal in a carrier and prevent agglomeration of the integrated circuits 300. Coated integrated circuits 300 can be added to a solution of a polymer such as, e.g. nitrocellulose (2-10% by solid) in ethyl or butyl acetate and stirred or sonicated to form uniform dispersion.

For aqueous dispersion of the integrated circuits 300, the integrated circuits 300 can be first coated, for example, with polyetheneoxide endcaped with trialkoxysilane to form a hydrophilic monolayer on the integrated circuits 300. The coated integrated circuits 300 are then dispersed in an aqueous solution, for example, of a mixture of polyvinylpyrrolidone and polyethyleneoxide diacrylate.

The above steps may be incorporated in a solution blending process so that the integrated circuits 300 are dispersed in a polymer blend. Polymer blends are widely used for 3D and 4D printing. A polymer blend may refer to a blended mixture of two or more polymers. A polymer blend may also refer to a blended mixture of one or more polymers with other materials such as ceramics, carbon nanostructures or other fillers. The polymers may include, among other things, polylactic acid (PLA), acrylonitrile butadiene (ABS), polyethylene terephthalate glycol (PETG), polypropylene (PP), carbon fiber, nylon, high-impact polystyrene (HIPS), thermoplastic elastomers, or any other suitable polymer.

Polymer powder with embedded integrated circuits 300 may be produced from the solution. For example, the solution may be cooled down from 80-100° C. to room-temperature to induce precipitation of polymer particles comprised of polymer grains with embedded integrated circuits 300, separating the precipitate, drying and mechanical treatment (milling, grinding, chipping, etc).

The plastic (i.e., polymer) powder with embedded integrated circuits 300 may be used to produce plastic pellets with the embedded integrated circuits 300. Each plastic grain in the powder or a plastic pellet may contain one or more, even thousands or more integrated circuits 300, which may be incorporated into the filament and then the 3D/4D printed structure. The plastic pellets with embedded integrated circuits 300 may be used to produce filaments with embedded integrated circuits 300. Filaments may also be produced directly from powder. It may be appreciated that substantially any technique, such as melt-blending, used for producing filaments from powders or pellets may be used. The filaments with embedded integrated circuits 300 can be used for printing 3D or 4D structures with embedded sensors. It may be appreciated that no change is needed in the 3D or 4D printing step because of the embedded sensors (i.e., integrated circuits 300).

Figure 4:
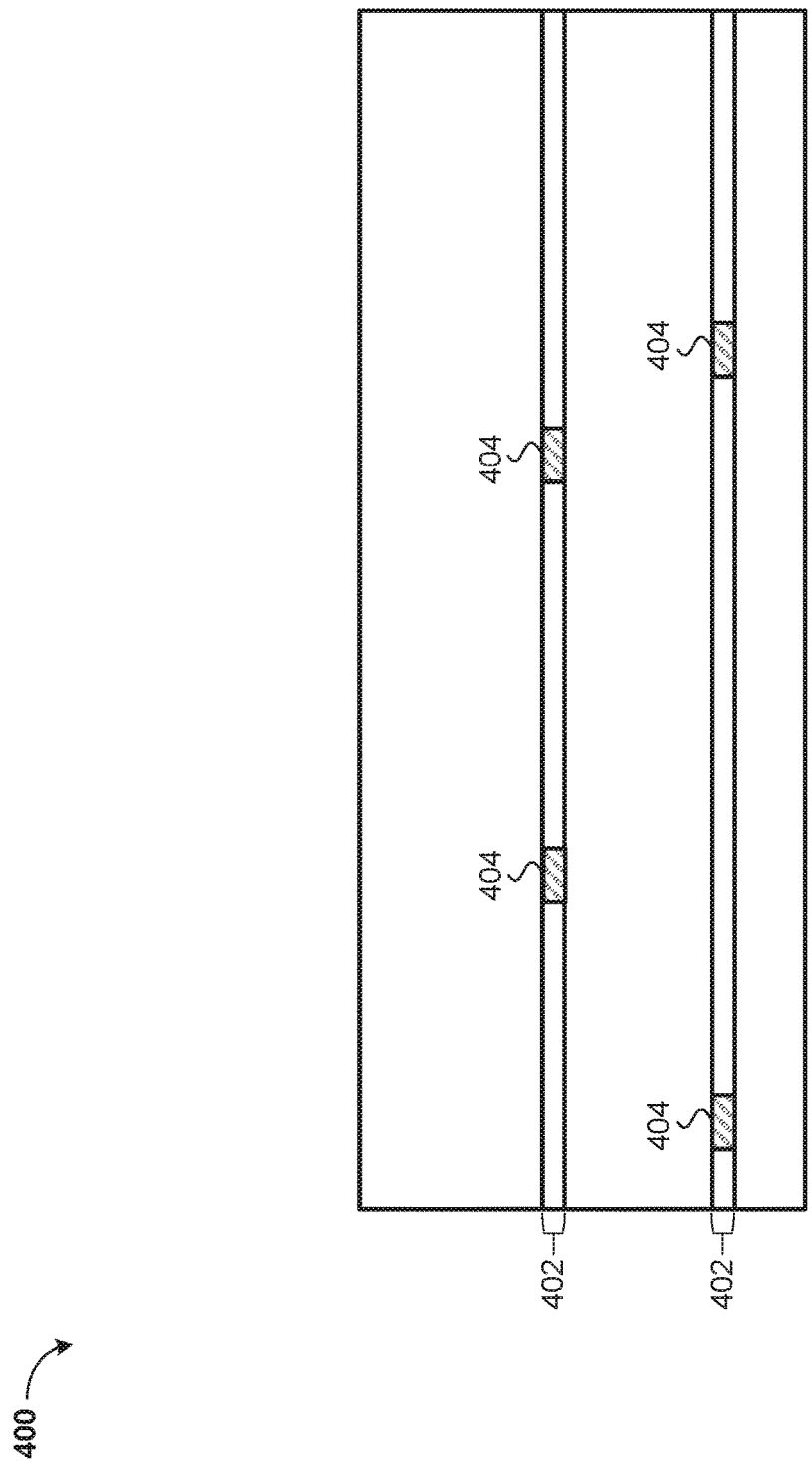
FIG. 4 is a block diagram of a 3D printed structure having embedded sensors through polymer filament infusion, according to at least one embodiment.

Referring now to FIG. 4, a diagram 400 of 3D-printed structure having one or more embedded semiconductor devices 300 (FIG. 3) is depicted according to one or more embodiments. The 3D printed structure may be composed of successively formed layers of filament 402. One or more of the layers of filament 402 may include regions 404 of filament having embedded integrated circuits 300. By registering the sensors and their location within the structure, the locations of the regions 404, therefore, may be known to a user of the 3D-printed structure.

Figure 5:
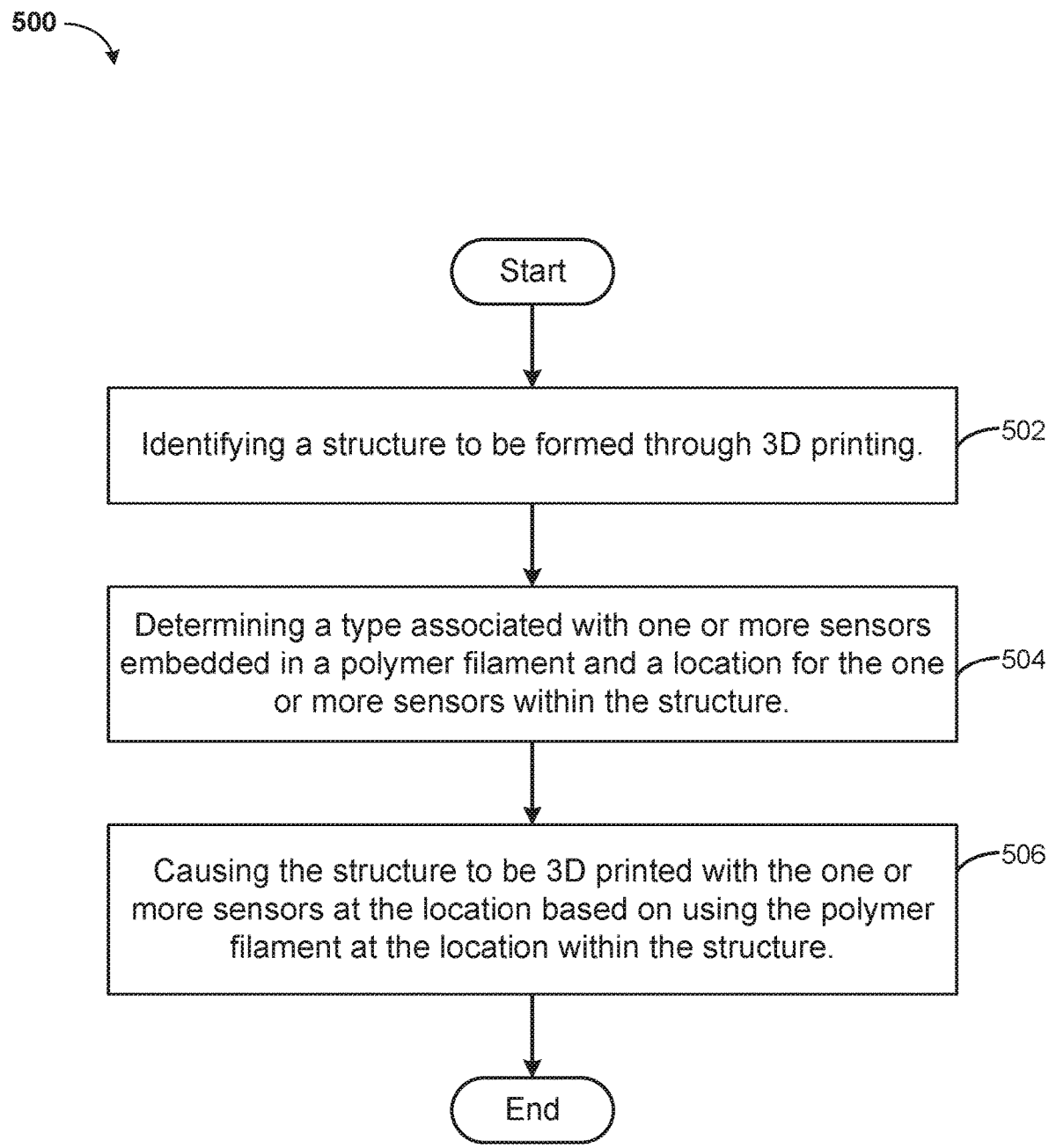
FIG. 5 is an operational flowchart illustrating the steps carried out by a program that enables chip-infused filament for 3D printing, according to at least one embodiment.

Referring now to FIG. 5, an operational flowchart illustrating the steps of a method 500 carried out by a program that enables chip-infused filament for 3D printing is depicted. The method 500 may be described with the aid of the exemplary embodiments of FIGS. 1-4.

At 502, the method 500 may include identifying a structure to be formed through 3D printing. One or more types of 3D-printable polymer filament may be used based on the requirements of the structure, and a filament quality may be adjusted based on capabilities associated with a printer associated with the structure. In operation, the Filament Infusion Program 216 (FIG. 2) on server computer 214 (FIG. 2) may identify a structure 400 (FIG. 4) to be 3D printed to include one or more integrated circuits 300 (FIG. 3G) that may be used, for example, as embedded sensors within the structure 400.

At 504, the method 500 may include determining a type associated with one or more sensors embedded in a polymer filament and a location for the one or more sensors within the structure. The 3D-printable polymer filament is embedded with the one or more sensors based on dispersing the one or more sensors within a solvent or an aqueous solution, forming 3D-printable polymer powder or pellets embedded with the one or more sensors from the solvent or aqueous solution, and forming the 3D-printable polymer filament embedded with the one or more sensors from the polymer powder or pellets. The 3D-printable polymer filament comprises one or more from among polylactic acid, acrylonitrile butadiene, polyethylene terephthalate glycol, polypropylene, carbon fiber, nylon, high-impact polystyrene, and thermoplastic elastomers. In operation, the Filament Infusion Program 216 (FIG. 2) may determine a specific type of integrated circuit 300 (FIG. 3G) for embedding within the structure 400 (FIG. 4) and determine one or more regions 404 (FIG. 4) for embedding of the integrated circuits 300.

At 506, the method 500 may include causing the structure to be 3D printed with the one or more sensors at the location based on using the polymer filament at the location within the structure. The structure is caused to be 3D printed based on determining a filament feed associated with the location within the structure, wherein embedding of the polymer within the structure occurs based on requirements associated with the 3D-printable polymer filament. The 3D-printable polymer filament is embedded with the one or more sensors based on dispersing the one or more sensors within a solvent or an aqueous solution, forming 3D-printable polymer powder or pellets embedded with the one or more sensors from the solvent or aqueous solution, and forming the 3D-printable polymer filament embedded with the one or more sensors from the polymer powder or pellets. In operation, the Filament Infusion Program 216 (FIG. 2) may cause the structure 400 (FIG. 4) to be 3D printed from successively formed layers of filament 402 (FIG. 4). During the printing, the Filament Infusion Program 216 (FIG. 2) may cause portions of the layers of filament 402 to be replaced at regions 404 (FIG. 4) with polymer filament having the embedded integrated circuits 300 (FIG. 3G). Thus, the Filament Infusion Program 216 may cause the structure 400 to have embedded integrated circuits at known locations within the structure 400.

It may be appreciated that FIG. 5 provides only an illustration of one implementation and does not imply any limitations with regard to how different embodiments may be implemented. Many modifications to the depicted environments may be made based on design and implementation requirements.

Figure 6:
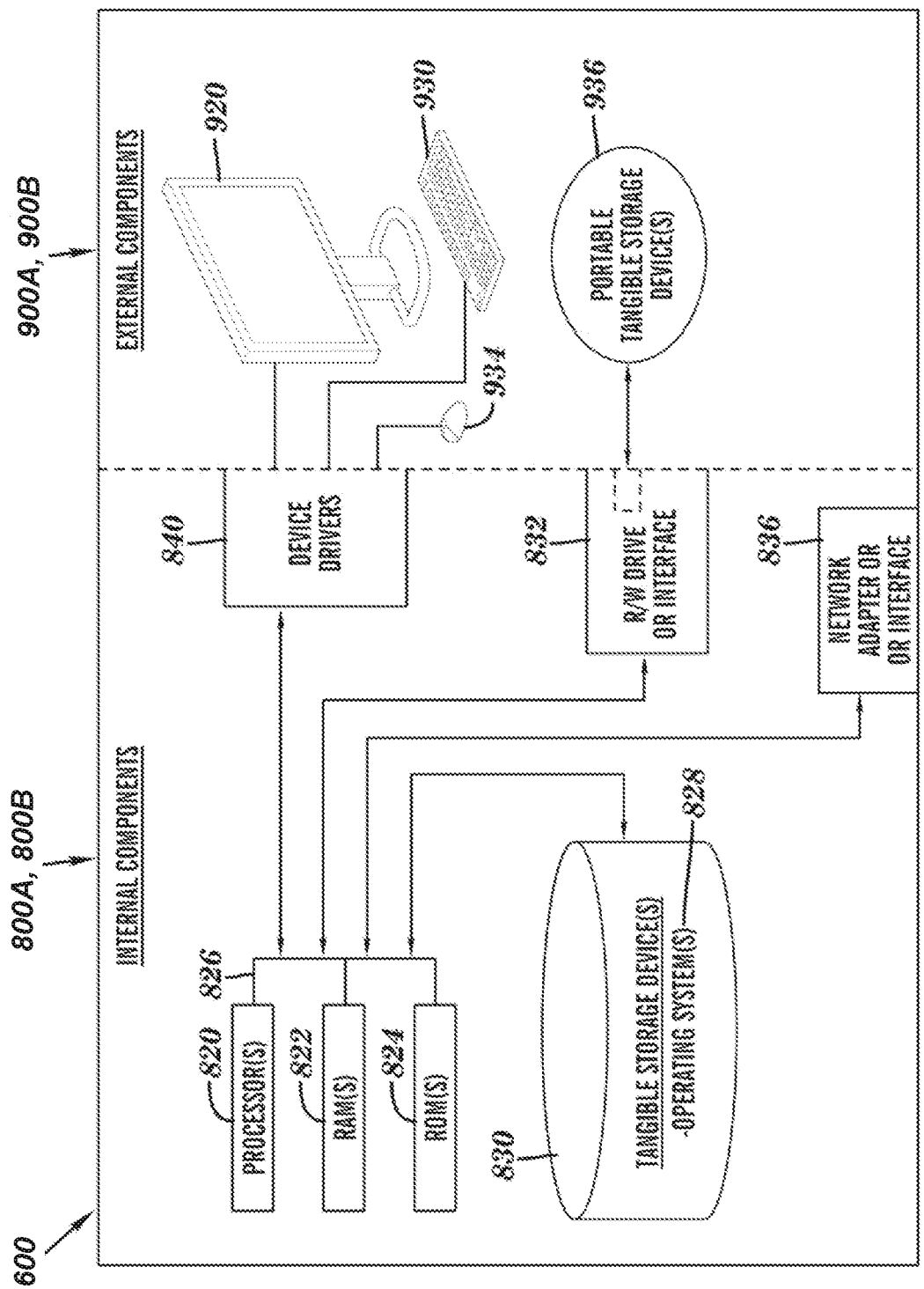
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Computer 202 (FIG. 2) and server computer 214 (FIG. 2) may include respective sets of internal components 800A,B and external components 900A,B illustrated in FIG. 6. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 include a component that permits communication among the internal components 800A,B.

The one or more operating systems 828, the software program 108 (FIG. 2) and the Filament Infusion Program 216 (FIG. 2) on server computer 214 (FIG. 2) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid-state disk, a compact disc (CD), a digital versatile disc (DVD), a floppy disk, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 2) and the Filament Infusion Program 216 (FIG. 2) can be stored on one or more of the respective portable computer-readable tangible storage devices 936, read via the respective R/W drive or interface 832 and loaded into the respective computer-readable tangible storage device 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 2) and the Filament Infusion Program 216 (FIG. 2) on the server computer 214 (FIG. 2) can be downloaded to the computer 202 (FIG. 2) and server computer 214 from an external computer via a network (for example, the Internet, a local area network or other, wide area network) and respective network adapters or interfaces 836. From the network adapters or interfaces 836, the software program 108 and the Filament Infusion Program 216 on the server computer 214 are loaded into the respective computer-readable tangible storage device 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in computer-readable tangible storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of enabling chip-infused filament for 3D printing, executable by a processor, comprising:
    identifying a structure to be formed through 3D printing;

determining a type associated with one or more sensors embedded in a 3D-printable polymer filament and a location for the one or more sensors within the structure; and causing the structure to be 3D printed with the one or more sensors at the location based on using the 3D-printable polymer filament at the location within the structure;

wherein the 3D-printable polymer filament is embedded with the one or more sensors based on:

dispersing the one or more sensors within an aqueous solution;

forming 3D-printable polymer powder embedded with the one or more sensors from the aqueous solution; and forming the 3D-printable polymer filament embedded with the one or more sensors from the polymer powder.

2. The method of claim 1, further comprising registering the one or more sensors and the location within the structure.

3. The method of claim 1, wherein the structure is caused to be 3D printed based on determining a filament feed associated with the location within the structure, wherein embedding of the polymer within the structure occurs based on requirements associated with the 3D-printable polymer filament.

4. The method of claim 1, wherein one or more types of 3D-printable polymer filament are used based on the requirements of the structure.

5. The method of claim 4, further comprising adjusting a filament quality based on capabilities associated with a printer associated with the structure.

6. The method of claim 1, further comprising:
producing pellets embedded with the one or more sensors from the polymer powder;
forming additional 3D-printable polymer filament embedded with the one or more sensors from the pellets.

7. The method of claim 1, wherein the 3D-printable polymer filament comprises one or more from among polylactic acid, acrylonitrile butadiene, polyethylene terephthalate glycol, polypropylene, carbon fiber, nylon, high-impact polystyrene, and thermoplastic elastomers.

8. A computer system for enabling chip-infused filament for 3D printing, the computer system comprising:
one or more computer-readable non-transitory storage media configured to store computer program code; and
one or more computer processors configured to access said computer program code and operate as instructed by said computer program code, said computer program code including:
identifying code configured to cause the one or more computer processors to identifying a structure to be formed through 3D printing;
determining code configured to cause the one or more computer processors to determine a type associated with one or more sensors embedded in a polymer filament and a location for the one or more sensors within the structure; and
causing code configured to cause the one or more computer processors to cause the structure to be 3D printed with the one or more sensors at the location based on using the polymer filament at the location within the structure;
wherein the 3D-printable polymer filament is embedded with the one or more sensors based on:
dispersing the one or more sensors within an aqueous solution;
forming 3D-printable polymer powder embedded with the one or more sensors from the aqueous solution; and
forming the 3D-printable polymer filament embedded with the one or more sensors from the polymer powder.

9. The computer system of claim 8, further comprising registering code configured to cause the one or more computer processors to register the one or more sensors and the location within the structure.

10. The computer system of claim 8, wherein the structure is caused to be 3D printed based on determining a filament feed associated with the location within the structure, wherein embedding of the polymer within the structure occurs based on requirements associated with the 3D-printable polymer filament.

11. The computer system of claim 8, wherein one or more types of 3D-printable polymer filament are used based on the requirements of the structure.

12. The computer system of claim 11, further comprising adjusting code configured to cause the one or more computer processors to adjust a filament quality based on capabilities associated with a printer associated with the structure.

13. The computer system of claim 8, further comprising:
producing pellets embedded with the one or more sensors from the polymer powder;
forming additional 3D-printable polymer filament embedded with the one or more sensors from the pellets.

14. The computer system of claim 8, wherein the 3D-printable polymer filament comprises one or more from among polylactic acid, acrylonitrile butadiene, polyethylene terephthalate glycol, polypropylene, carbon fiber, nylon, high-impact polystyrene, and thermoplastic elastomers.

15. A non-transitory computer readable medium having stored thereon a computer program for enabling chip-infused filament for 3D printing, the computer program configured to cause one or more computer processors to:
identify a structure to be formed through 3D printing;
determine a type associated with one or more sensors embedded in a polymer filament and a location for the one or more sensors within the structure; and
cause the structure to be 3D printed with the one or more sensors at the location based on using the polymer filament at the location within the structure;
wherein the 3D-printable polymer filament is embedded with the one or more sensors based on:
dispersing the one or more sensors within an aqueous solution;
forming 3D-printable polymer powder embedded with the one or more sensors from the aqueous solution; and
forming the 3D-printable polymer filament embedded with the one or more sensors from the polymer powder.

16. The computer readable medium of claim 15, wherein the computer program is further configured to cause the one or more computer processors to register the one or more sensors and the location within the structure.

17. The computer readable medium of claim 15, wherein the structure is caused to be 3D printed based on determining a filament feed associated with the location within the structure, wherein embedding of the polymer within the structure occurs based on requirements associated with the 3D-printable polymer filament.

18. The computer readable medium of claim 15, wherein one or more types of 3D-printable polymer filament are used based on the requirements of the structure.

19. The computer readable medium of claim 18, wherein the computer program is further configured to cause the one or more computer processors to adjust a filament quality based on capabilities associated with a printer associated with the structure.

20. The computer readable medium of claim 15, further comprising:
    producing pellets embedded with the one or more sensors from the polymer powder;
    forming additional 3D-printable polymer filament embedded with the one or more sensors from the pellets.

* * * * *